(12) United States Patent  
Kiyuna

(10) Patent No.: US 12,412,021 B2  
(45) Date of Patent: Sep. 9, 2025

(54) LAYOUT DESIGN SUPPORT APPARATUS, LAYOUT DESIGN SUPPORT METHOD, AND MANUFACTURING METHOD OF SEMICONDUCTOR DEVICE

(71) Applicant: ABLIC Inc., Tokyo (JP)

(72) Inventor: Tadashi Kiyuna, Kanagawa (JP)

(73) Assignee: ABLIC Inc., Nagano (JP)

( * ) Notice: Subject to any disclaimer, the term of this patent is extended or adjusted under 35 U.S.C. 154(b) by 578 days.

(21) Appl. No.: 17/966,878

(22) Filed: Oct. 16, 2022

(65) Prior Publication Data

US 2023/0169254 A1 Jun. 1, 2023

(30) Foreign Application Priority Data

Nov. 30, 2021 (JP) ................................. 2021-193734

(51) Int. Cl.  
*G06F 30/398* (2020.01)  
*G06F 119/06* (2020.01)

(52) U.S. Cl.  
CPC ........ *G06F 30/398* (2020.01); *G06F 2119/06* (2020.01)

(58) Field of Classification Search  
CPC ...... G06F 30/39; G06F 30/392; G06F 30/394; G06F 30/398; G06F 2119/06; G06F 2117/12; G06F 30/367; H10D 89/10  
USPC ......................................................... 716/119  
See application file for complete search history.

(56) References Cited

U.S. PATENT DOCUMENTS

2012/0032273 A1 2/2012 Suzuki  
2015/0082266 A1* 3/2015 Mizuta .................. G06F 30/398  
716/118

FOREIGN PATENT DOCUMENTS

JP 2000124320 4/2000  
JP 2012054530 3/2012

OTHER PUBLICATIONS

Matthew Hogan et al., "Using static voltage analysis and voltage-aware DRC to identify EOS and oxide breakdown reliability issues," 35th Electrical Overstress/Electrostatic Discharge Symposium, Sep. 2013, pp. 1-6.

"Search Report of Europe Counterpart Application", issued on May 3, 2023, p. 1-p. 11.

* cited by examiner

*Primary Examiner* — Paul Dinh  
(74) *Attorney, Agent, or Firm* — JCIPRNET

(57) ABSTRACT

A layout design support apparatus 100 determines, in a circuit element connected to a first external terminal P1 to which a first potential identification label is added, whether to short-circuit one terminal connected to the first external terminal P1 and another terminal based on a determination criterion according to element type information and breakdown voltage information, adds the first potential identification label to the circuit components on a path from the first external terminal P1 to the one terminal of the circuit element to identify a first equipotential region according to determining not to short-circuit, repeatedly performs determination for the circuit element connected to the another terminal and identifies the first equipotential region according to determining to short-circuit, and identifies a second equipotential region when receiving a second potential identification label to be added to a second external terminal P2.

11 Claims, 12 Drawing Sheets

LAYOUT DESIGN SUPPORT APPARATUS, LAYOUT DESIGN SUPPORT METHOD, AND MANUFACTURING METHOD OF SEMICONDUCTOR DEVICE

CROSS-REFERENCE TO RELATED APPLICATION

This application claims the priority benefits of Japanese application no. 2021-193734, filed on Nov. 30, 2021. The entirety of the above-mentioned patent application is hereby incorporated by reference herein and made a part of this specification.

BACKGROUND

Technical Field

The present invention relates to a layout design support apparatus, a layout design support method, and a manufacturing method of a semiconductor device.

Description of Related Art

In a semiconductor integrated circuit, circuit elements having different operating voltages may coexist on one chip. In such a case, for example, when a circuit element H operating at a high voltage $V_H$ and a circuit element L operating at a voltage $V_L$ lower than the voltage $V_H$ coexist on one chip, the circuit element H needs to have a breakdown voltage corresponding to the voltage $V_H$, and the circuit element L needs to have a breakdown voltage corresponding to the voltage $V_L$.

If each circuit element is not designed with a breakdown voltage corresponding to its operating voltage, the layout area of the entire chip may become large, or the breakdown voltage of the circuit element may become insufficient. In other words, if the entire chip is designed with a breakdown voltage corresponding to the high voltage $V_H$, it is necessary to increase the dimensions of each component in the circuit element and widen the distance between the components, and therefore, the layout area of the circuit element L may become larger than necessary. Furthermore, since it is necessary to increase the distance between the circuit elements, the layout area of the entire chip becomes large. Conversely, if the entire chip is designed with a breakdown voltage corresponding to the low voltage $V_L$, the circuit element H cannot obtain a sufficient breakdown voltage. For this reason, when circuit elements operating by power supplies with different voltage values coexist on one chip, each circuit element is designed to have a breakdown voltage corresponding to its operating voltage.

When designing a semiconductor integrated circuit, a layout design support apparatus is often used to verify whether or not the layout of the circuit elements and wiring is appropriate. When a user constructs a "netlist" which is data of connection information for each terminal of each circuit element, the layout design support apparatus first executes a DRC (Design Rule Check) to verify whether the layout created from the netlist satisfies the design rule corresponding to the breakdown voltage. Then, the layout design support apparatus adds DRC error information as the verification result to the netlist and displays a layout diagram in which the netlist and the error information are combined to support the layout design.

For such a layout design support apparatus, for example, it has been proposed to display a dummy layer generated according to the breakdown voltage of each element together with the error information by superimposing it on a layout diagram for the purpose of efficiently performing layout verification on an integrated circuit including elements having different breakdown voltages in a short time. Besides, for example, for a semiconductor device in which two transistors having different breakdown voltages are embedded, a layout design support apparatus has been proposed which prevents an electrically isolated dummy wiring from being arranged adjacent to a wiring having a high breakdown voltage for the purpose of preventing the occurrence of a short circuit between wirings via the dummy wiring.

SUMMARY

According to one aspect of the present invention, the present invention provides a layout design support apparatus which can easily identify regions with equal potentials even when circuit elements having different breakdown voltages coexist on one chip, and therefore, can lay out the space between wirings to the minimum size which meets the breakdown voltage to design a semiconductor device having a small chip size at low cost.

A layout design support apparatus according to an embodiment of the present invention is provided for an integrated circuit in which a plurality of circuit elements having different breakdown voltages coexist. The layout design support apparatus includes: a storage device storing circuit connection data of the integrated circuit combining circuit components which include a first external terminal, a second external terminal, and the circuit elements to which element type information and breakdown voltage information are to be added; an input device receiving first potential information to be added to the first external terminal; and a control device which determines, in the circuit element connected to the first external terminal to which the first potential information is added, whether to short-circuit one terminal connected to the first external terminal and another terminal based on a determination criterion according to the element type information and the breakdown voltage information, adds the first potential information to the circuit components on a path from the first external terminal to the one terminal of the circuit element to identify a first equipotential region when determining not to short-circuit the one terminal and the another terminal of the circuit element, and repeatedly performs determination for the circuit element connected to the another terminal and identifies the first equipotential region when determining to short-circuit the one terminal and the another terminal of the circuit element. The control device identifies a second equipotential region when the input device receives second potential information to be added to the second external terminal.

According to one aspect of the present invention, it is possible to provide a layout design support apparatus which can easily identify regions with equal potentials even when circuit elements having different breakdown voltages coexist on one chip, and therefore, can lay out the space between wirings to the minimum size which meets the breakdown voltage to design a semiconductor device having a small chip size at low cost.

DESCRIPTION OF THE EMBODIMENTS

Figure 1:
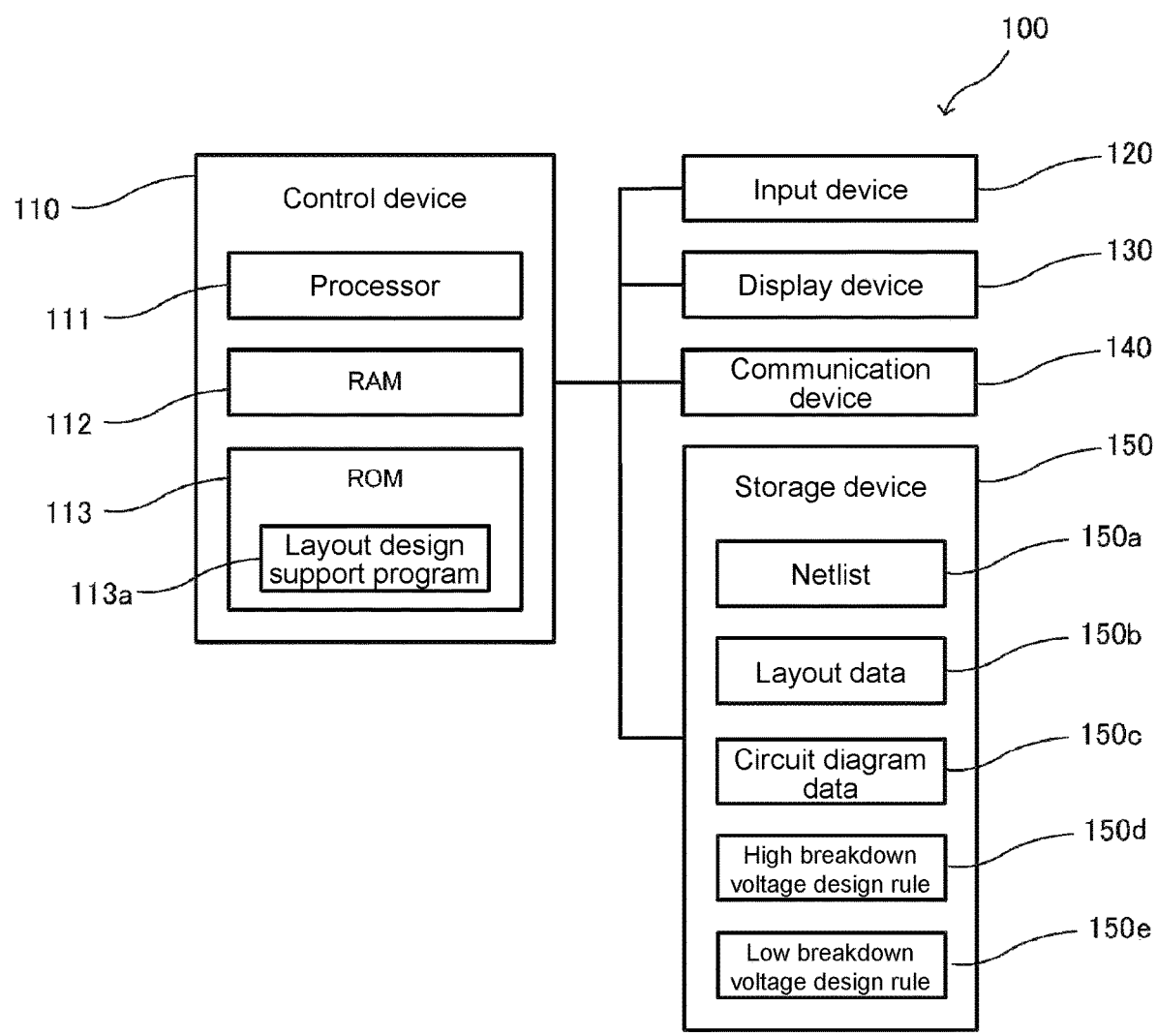
FIG. 1 is a block diagram illustrating the hardware configuration of the layout design support apparatus according to the first embodiment.

In order for the conventional layout design support apparatuses to perform processing appropriately, it is necessary for the user to add a potential identification label as potential information to each circuit component such as a terminal of a circuit element, an external terminal, and a wiring without omission and mistake.

However, when there are many wiring layers and the number of circuit elements and wirings in the netlist is enormous, there is a possibility that the user may not be able to attach the potential identification label without omission and mistake, and an appropriate verification result may not be obtained. Further, even though the user adds the potential identification label without omission and mistake, if a high breakdown voltage potential identification label is attached to one terminal of a low breakdown voltage circuit element and a low breakdown voltage potential identification label is attached to another terminal of the circuit element, the layout design support apparatus may assume that a high breakdown voltage is applied between the terminals of the circuit element and fail to obtain an appropriate verification result.

Thus, when the user adds a potential identification label, which is the value of the operating voltage to be applied, to one external terminal, the layout design support apparatus according to an embodiment of the present invention determines whether to short-circuit the terminals in a circuit element based on the breakdown voltage information of a previous circuit element tracing the wiring, with the external terminal receiving the potential information as a starting point. When determining to short-circuit, the layout design support apparatus repeats the determination for the next circuit element connected to the short-circuited previous terminal to extract circuit components with equal potentials and respectively add the potential information received by the external terminal to the extracted circuit components. As a result, the layout design support apparatus according to an embodiment of the present invention can easily identify the regions with equal potentials even when circuit elements having different breakdown voltages coexist on one chip.

Hereinafter, embodiments of the layout design support apparatus according to the present invention will be described in detail with reference to the drawings, with circuit connection data as a netlist and potential information as a potential identification label. In the drawings, the same components may be denoted by the same reference numerals, and redundant description may be omitted.

The layout design support apparatus according to an embodiment of the present invention is an apparatus which executes a layout design support program according to an embodiment of the present invention to execute a layout design support method according to an embodiment of the present invention. Thus, the description of the layout design support program and the layout design support method according to an embodiment of the present invention will be substituted by the description of the operation of the layout design support apparatus according to an embodiment of the present invention. Further, a manufacturing method of a semiconductor device according to an embodiment of the present invention is a method for manufacturing a semiconductor device, including a process of designing an integrated circuit of the semiconductor device using the layout design support apparatus according to an embodiment of the present invention. Thus, in the manufacturing method of the semiconductor device according to an embodiment of the present invention, the process of manufacturing the semiconductor device from a semiconductor wafer may be an ordinary process, so description thereof will be omitted.

FIG. 1 is a block diagram illustrating the hardware configuration of the layout design support apparatus according to the first embodiment. The layout design support apparatus 100 according to the first embodiment has a function of executing various processes related to design support for the layout of circuit elements arranged in an integrated circuit of a semiconductor device in addition to a function of executing the layout design support program. As illustrated in FIG. 1, the layout design support apparatus 100 includes a control device 110, an input device 120, a display device 130, a communication device 140, and a storage device 150.

The control device 110 is used to control the operation of the layout design support apparatus 100 as a whole. This control device 110 has a function of executing the layout design support program in addition to a function of executing various processes.

Specifically, the control device 110 allows the user to input codes indicating circuit components including various circuit elements, external terminals, and wirings from the input device 120, and can construct a netlist 150a which connects terminals of the circuit elements and the external terminals. Furthermore, the control device 110 can create layout data 150b indicating the pattern of the physical shape of the integrated circuit from the netlist 150a. In addition, the control device 110 can display a layout diagram based on the layout data 150b on the display device 130 for the user. Further, the control device 110 can create circuit diagram data 150c by applying circuit diagram symbols to the codes based on the netlist 150a. The control device 110 can display the circuit diagram based on the circuit diagram data 150c on the display device 130 for the user. This control device 110 causes the storage device 150 to store the netlist 150*a*, the layout data 150*b*, and the circuit diagram data 150*c*.

Examples of the circuit components include various circuit elements, external terminals, and wirings.

The circuit element has element type information and breakdown voltage information. The element type information is information indicating the type of the circuit element, and includes information indicating the number of terminals according to the type and the function of each terminal. There is no particular restriction on the type of the circuit element, which can be appropriately selected according to the purpose, and examples thereof include MOS (Metal-Oxide-Semiconductor) transistors, bipolar transistors, diodes, capacitors, etc. A potential identification label is added to each terminal of the circuit element. The breakdown voltage information may be selected by the user according to the operating voltage of the circuit element. Further, the breakdown voltage information may be classified as low breakdown voltage or high breakdown voltage according to the degree of the miniaturization process. For example, in an integrated circuit formed by a certain process, an element which requires an operating voltage of +100 V may be classified as a high breakdown voltage element, and an element which requires an operating voltage of +1.8V or +5.0 V may be classified as a low breakdown voltage element. Furthermore, in an integrated circuit formed by a finer process, an element which requires an operating voltage of +1.2V may be distinguished as a high breakdown voltage element, and an element which requires an operating voltage of +0.8V may be distinguished as a low breakdown voltage element.

The external terminal is a portion called a bonding pad in an IC (Integrated Circuit) chip and has breakdown voltage information. Further, a potential identification label is added to the external terminal by the user.

The wiring is a wiring on the IC chip and has breakdown voltage information. A potential identification label is added to the wiring.

The potential indicated by the potential identification label is not particularly limited and can be appropriately selected according to the purpose, and may be, for example, a high potential of +100 V or a low potential of 0 V.

The control device 110 includes a processor 111, a RAM (Random Access Memory) 112, and a ROM (Read Only Memory) 113.

The processor 111 is a CPU (Central Processing Unit) or the like, and realizes various functions by executing an OS (Operating System) and various programs stored in the ROM 113 or the storage device 150.

The RAM 112 functions as a work area or the like where various programs such as the layout design support program 113*a* are expanded when executed by the processor 111.

The ROM 113 stores various programs such as a BIOS (Basic Input/Output System) including the layout design support program 113*a*. In this embodiment, the layout design support program 113*a* is stored in the ROM 113, but not limited thereto. For example, a solid state drive, a magnetic tape, a portable storage device, a storage device on a network, etc. may be used instead of the ROM 113. Examples of the portable storage device include CD (Compact Disc) drives, USB (Universal Serial Bus) memories, etc.

The input device 120 is, for example, a keyboard, a mouse or the like. This input device 120 receives input of various instructions and various information from the user.

The display device 130 is, for example, a display such as an LCD (Liquid Crystal Display). This display device 130 displays, for example, various data such as codes and netlists, circuit diagrams, layout diagrams, etc.

The communication device 140 is, for example, a wireless LAN (Local Area Network) module, a wired LAN module or the like. This communication device 140 communicably connects the layout design support apparatus 100 to another personal computer or the like through an Internet line, an Ethernet line, etc.

The storage device 150 is, for example, an HDD (Hard Disk Drive) which stores programs, data, etc. This storage device 150 stores a high breakdown voltage design rule 150*d* and a low breakdown voltage design rule 150*e* in addition to the netlist 150*a*, the layout data 150*b*, and the circuit diagram data 150*c*. The high breakdown voltage design rule 150*d* and the low breakdown voltage design rule 150*e* are design rules which are determined for each breakdown voltage with respect to the layout. For example, dimensions of the circuit elements, distances between the circuit elements, wiring widths, wiring lengths, wiring intervals, etc. are determined.

Figure 2:
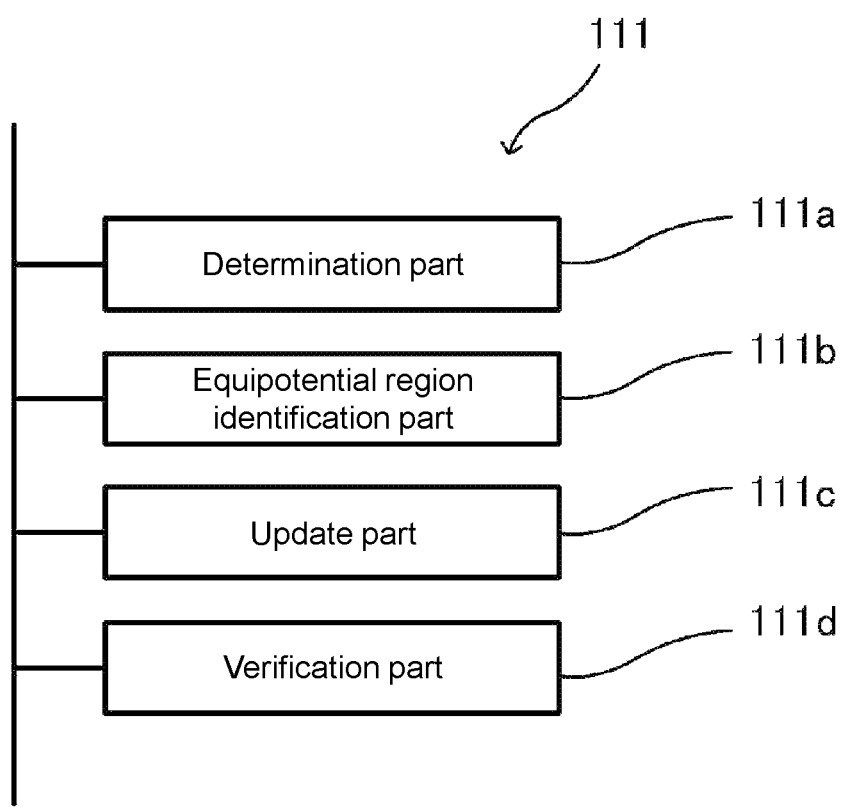
FIG. 2 is a block diagram illustrating the functional configuration of the control device of the layout design support apparatus according to the first embodiment.

FIG. 2 is a block diagram illustrating the functional configuration of the control device of the layout design support apparatus according to the first embodiment. As illustrated in FIG. 2, the functions of the processor 111 include a determination part 111*a*, an equipotential region identification part 111*b*, an update part 111*c*, and a verification part 111*d*.

In the circuit element connected to the first external terminal to which the potential identification label is added, the determination part 111*a* determines whether to short-circuit one terminal connected to the external terminal and another terminal based on a determination criterion according to the element type information and the breakdown voltage information. Specifically, when the potential identification label is added to one of a plurality of external terminals by the input device 120, with the external terminal to which the potential identification label is added as a starting point, the determination part 111*a* determines whether to short-circuit the terminals in the circuit element based on the determination criterion according to the element type information and the breakdown voltage information of the previous circuit element tracing the wiring.

Here, the "determination criterion" of a circuit element whose breakdown voltage information is a high breakdown voltage will be described. For a circuit element whose breakdown voltage information is a low breakdown voltage, it is determined to short-circuit all the terminals regardless of the element type information.

In this embodiment, the element type information in the circuit element indicates an NMOS transistor, and if the breakdown voltage information indicates a high breakdown voltage, the determination part 111*a* determines to short-circuit the gate and the source and not to short-circuit the gate and the drain and the drain and the source. Depending on the type of the high breakdown voltage NMOS transistor, it may be determined not to short-circuit all the terminals. However, if the breakdown voltage information indicates a low breakdown voltage as described above, it is determined to short-circuit all the terminals.

Moreover, when the NMOS transistor is diode-connected, it is determined to short-circuit the terminals even if it has a high breakdown voltage. Diode connection means to connect the gate and the drain of the NMOS transistor, and is used when the NMOS transistor operates like a diode.

If the element type information in the circuit element indicates a diode and the breakdown voltage information indicates a high breakdown voltage, it is determined to short-circuit when a DC voltage is applied in the forward direction, and it is determined not to short-circuit when a DC voltage is applied in the reverse direction. As described above, if the breakdown voltage information indicates a low breakdown voltage, it is determined to short-circuit both terminals regardless of the voltage application direction.

If the element type information in the circuit element indicates a capacitor and the breakdown voltage information indicates a high breakdown voltage, it is determined not to short-circuit. As described above, if the breakdown voltage information indicates a low breakdown voltage, it is determined to short-circuit both terminals.

Based on the above determination criterion, the determination part 111a determines whether to short-circuit one terminal and another terminal of the circuit element.

When the determination part 111a determines not to short-circuit one terminal and another terminal of the circuit element, the equipotential region identification part 111b identifies an equipotential region by adding potential information to the circuit components on the path from the external terminal to the one terminal of the circuit element. Further, when the determination part 111a determines to short-circuit one terminal and another terminal of the circuit element, the equipotential region identification part 111b repeats the determination for the circuit element connected to the another terminal and identifies the equipotential region.

Thus, with the first external terminal to which the first potential identification label is added by the user as a starting point, the determination part 111a determines whether to short-circuit the terminals in the circuit element based on the element type information and the breakdown voltage information of the previous circuit element tracing the wiring. When the determination part 111a determines to short-circuit, the determination part 111a repeats the determination for the next circuit element connected to the short-circuited previous terminal to extract the circuit components with equal potential. The equipotential region identification part 111b can identify a first equipotential region by respectively adding the first potential identification label added to the first external terminal to the extracted circuit components.

Then, when identifying a second equipotential region having a potential different from the potential of the first equipotential region, the determination part 111a and the equipotential region identification part 111b identify the second equipotential region, with the second external terminal to which the second potential identification label is added by the user as a starting point, in the same manner as identifying the first equipotential region.

Next, the operation of identifying the range of the equipotential region performed by the layout design support apparatus 100 will be described following the flowchart illustrated in FIG. 3 with reference to FIG. 1 and FIG. 2.

Figure 3:
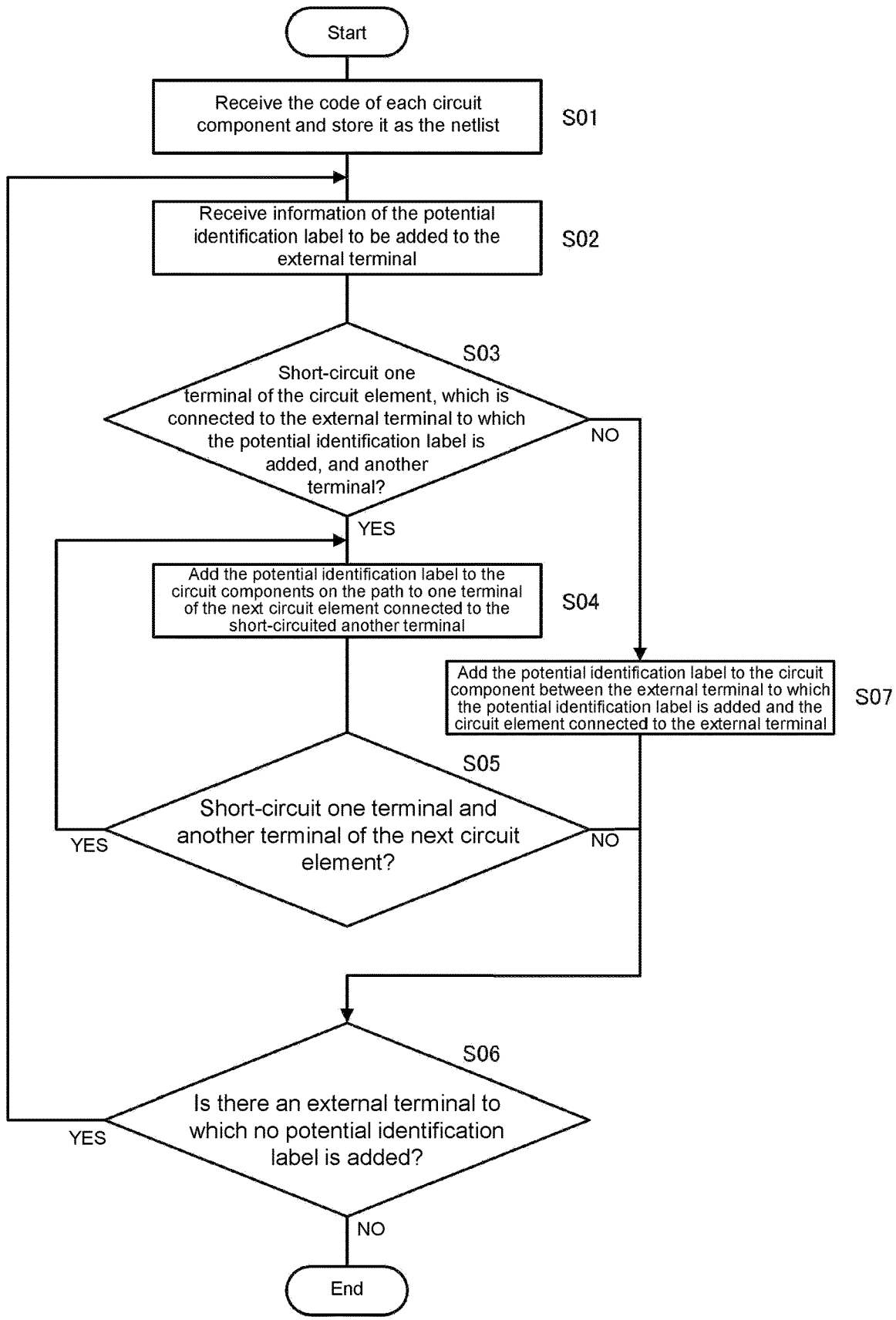
FIG. 3 is a flowchart illustrating the flow of processing for identifying the range of the equipotential region in the first embodiment.

FIG. 3 is a flowchart illustrating the flow of processing for identifying the range of the equipotential region in the first embodiment. As illustrated in FIG. 3, first, the input device 120 receives the code of each circuit component, and the storage device 150 stores the received code as the netlist (step S01). At this time, the control device 110 extracts the external terminal among the circuit components from the netlist for the next step S02.

Next, when the input device 120 receives from the user the information of the potential identification label to be added to the external terminal (step S02), the determination part 111a of the control device 110 determines whether to short-circuit one terminal of the circuit element, which is connected to the external terminal to which the potential identification label is added, and another terminal based on the determination criterion (step S03). The another terminal may be singular or plural.

When the determination part 111a determines to short-circuit one terminal of the circuit element, which is connected to the external terminal, and another terminal, the equipotential region identification part 111b adds the potential identification label to the circuit components on the path to one terminal of the next circuit element connected to the short-circuited another terminal (step S04). Subsequently, the determination part 111a determines whether to short-circuit one terminal and another terminal of the next circuit element (step S05), and the process returns to step S04 if the determination part 111a determines to short-circuit, and the determination part 111a repeats the process of adding the potential identification label to the circuit components on the path to one terminal of the next circuit element until the determination part 111a determines not to short-circuit in step S05.

Further, in step S05, if the determination part 111a determines not to short-circuit, the determination part 111a determines whether there is an external terminal to which no potential identification label is added (step S06), and the process returns to step S02 if the determination part 111a determines that there is an external terminal to which no potential identification label is added, and the determination part 111a performs a process of receiving information of the potential identification label from the user for the external terminal to which a potential identification label is added. The potential identification label to be added here may be a potential identification label with a potential different from the potential of the original potential identification label, or may be a potential identification label with an equal potential. Then, when it is determined in step S06 that there is no external terminal to which no potential identification label is added, this operation ends.

Further, in step S03, when the determination part 111a determines not to short-circuit one terminal of the circuit element, which is connected to the external terminal, and another terminal, the equipotential region identification part 111b adds the potential identification label to the circuit component between the external terminal to which the potential identification label is added and the circuit element connected to the external terminal (step S07). Subsequently, the process proceeds to step S06, and when it is determined by the determination part 111a that there is an external terminal to which no potential identification label is added, the process returns to step S02, and a potential identification label is received from the user for the external terminal to which no potential identification label is added. Further, when the determination part 111a determines that there is no external terminal to which no potential identification label is added, this operation ends.

In this manner, the layout design support apparatus 100 can easily identify the range of the equipotential region even when circuit elements having different breakdown voltages coexist on one chip.

Next, the operation of the layout design support apparatus 100 will be described with reference to FIG. 5A to FIG. 5E using the circuit illustrated in FIG. 4 as an example.

Figure 4:
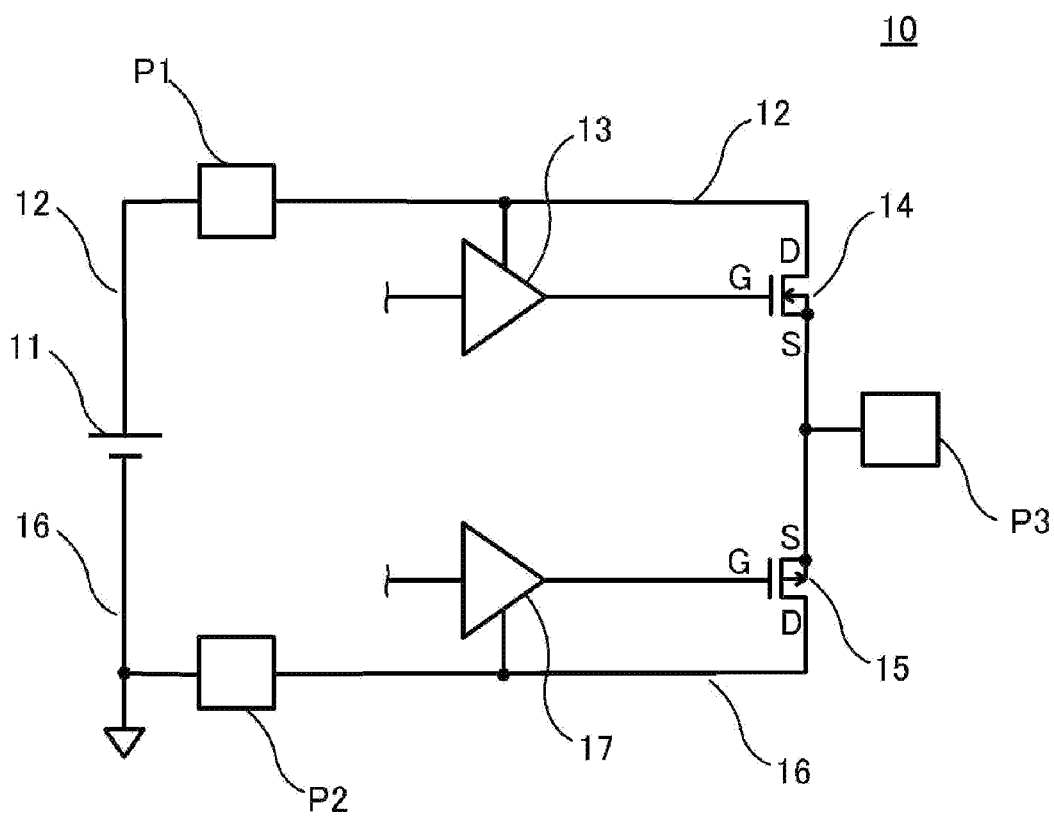
FIG. 4 is a circuit diagram based on an example of the circuit diagram data created from the netlist constructed by the user.

FIG. 4 is a circuit diagram based on an example of the circuit diagram data created from the netlist constructed by the user. As illustrated in FIG. 4, a circuit 10 has a DC power supply 11 connected between an external terminal P1 and an external terminal P2. Further, the external terminal P2 and the negative electrode side of the DC power supply 11 are connected to the 0 V potential. The power supply terminal of an amplifier 13 and the drain terminal of an NMOS transistor 14 are connected to a power supply voltage line 12 connected to the positive electrode side of the DC power supply 11. The amplifier 13 has an output port connected to the gate terminal of the NMOS transistor 14. The NMOS transistor 14 has a source terminal connected to an external terminal P3 and the source terminal of a PMOS transistor 15. The GND terminal of an amplifier 17 and the drain terminal of the PMOS transistor 15 are connected to a GND line 16 connected to the negative electrode side of the DC power supply 11. The amplifier 17 has an output port connected to the gate terminal of the PMOS transistor 15.

Figure 5A:
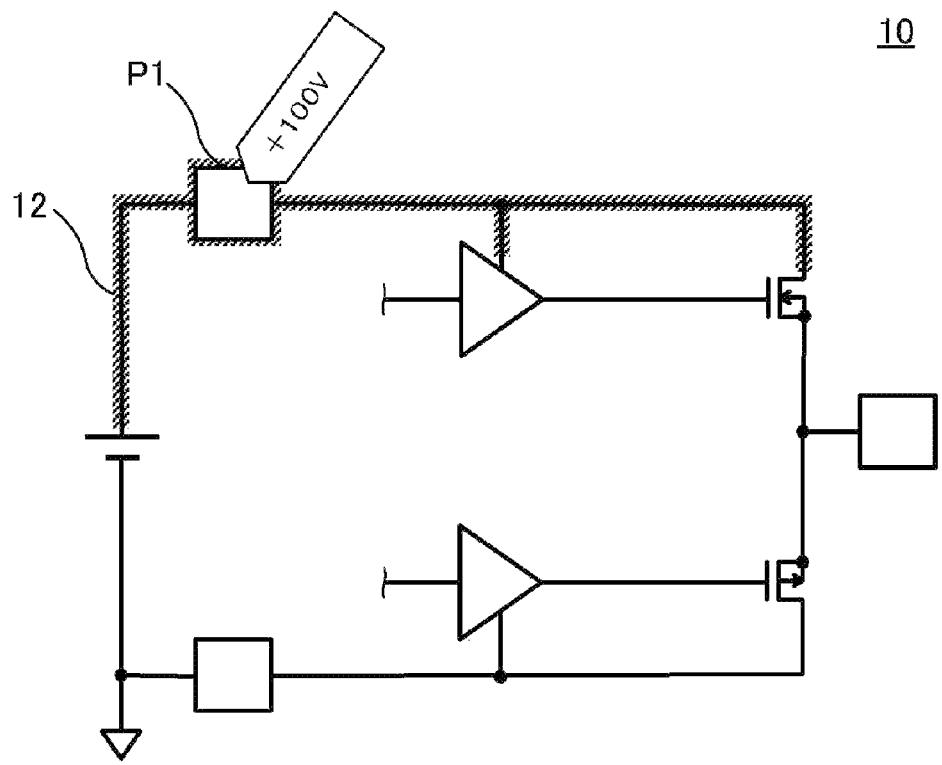
FIG. 5A is an explanatory diagram illustrating an example of the processing for identifying the range of the equipotential region in the first embodiment.

In this circuit 10, as illustrated in FIG. 5A, if the user adds a potential identification label of "+100 V" to the external terminal P1, a potential identification label of "+100 V" (represented by hatching in the drawing) is added to the power supply voltage line 12, which is a wiring connected to the external terminal P1.

Figure 5B:
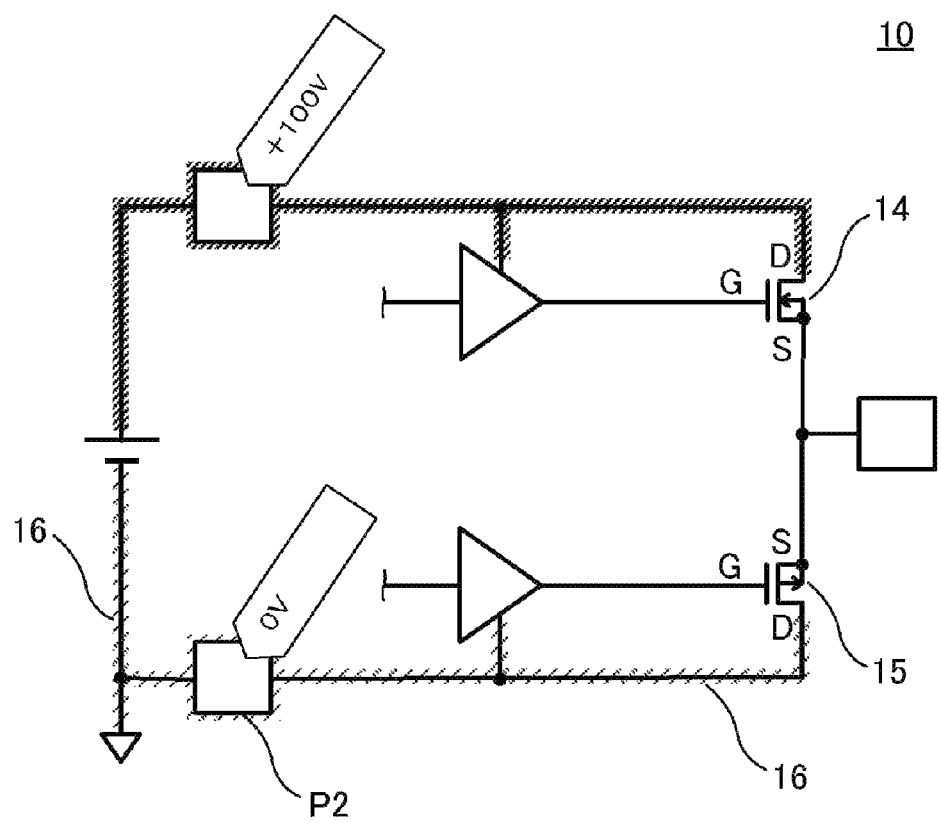
FIG. 5B is an explanatory diagram illustrating an example of the processing for identifying the range of the equipotential region in the first embodiment.

Next, as illustrated in FIG. 5B, if the user adds a potential identification label of "0 V" to the external terminal P2, a potential identification label of "0 V" is added to the GND line 16, which is a wiring connected to the external terminal P2.

Next, the NMOS transistor 14 and the PMOS transistor 15 are taken into consideration.

Figure 5C:
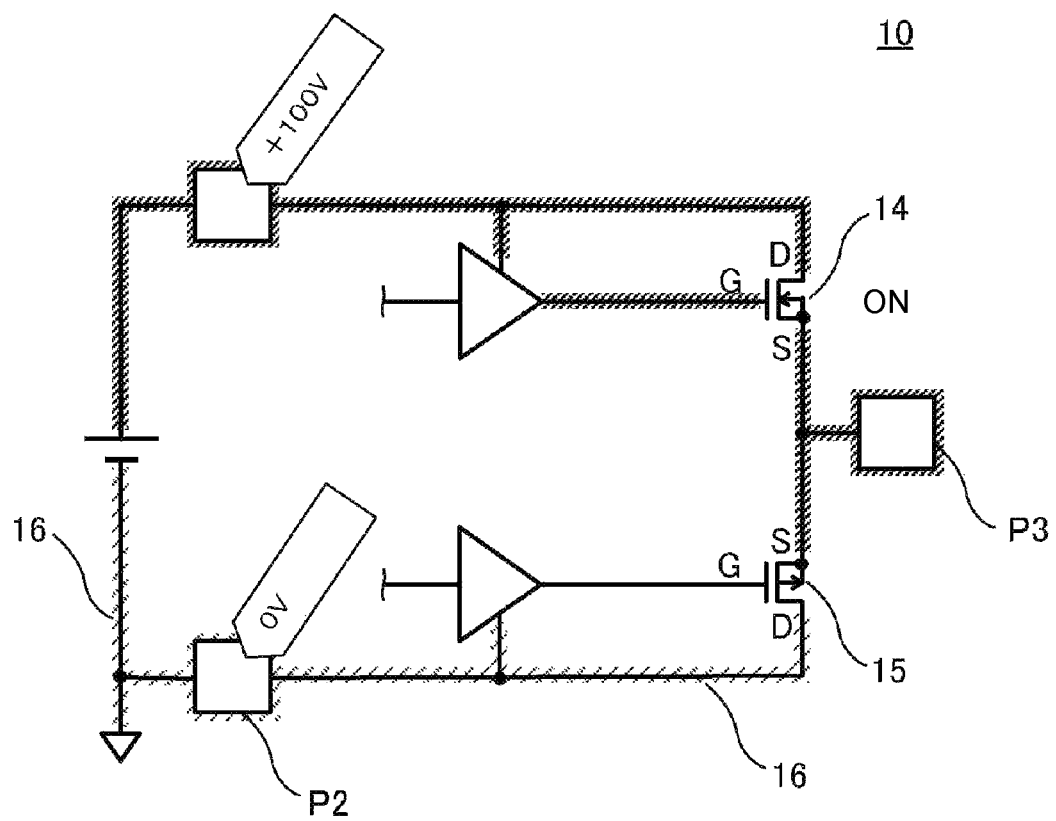
FIG. 5C is an explanatory diagram illustrating an example of the processing for identifying the range of the equipotential region in the first embodiment.

The NMOS transistor 14 has a potential identification label of "+100 V" added to the drain terminal, and based on the determination criterion of this embodiment, the gate and the source have a low breakdown voltage therebetween and are short-circuited. Thus, as illustrated in FIG. 5C, when the NMOS transistor 14 is set to the ON state, conduction between the drain and the source is on, by which a potential identification label of "+100 V" is added to the source terminal and the gate terminal of the NMOS transistor 14 and the external terminal P3.

Figure 5D:
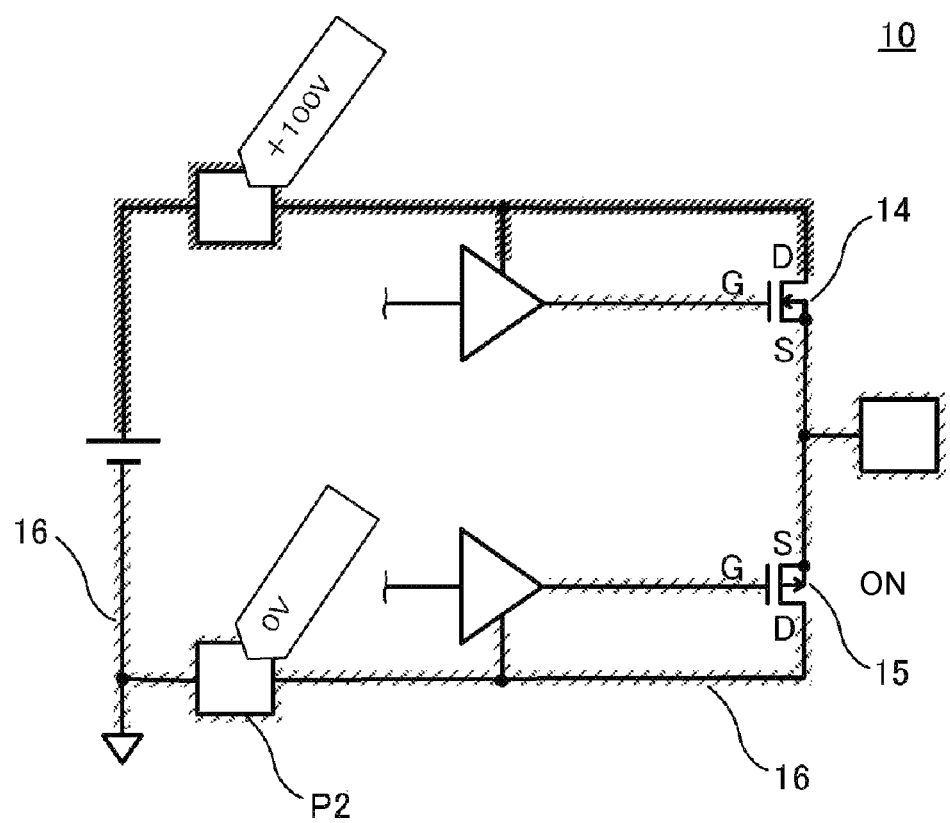
FIG. 5D is an explanatory diagram illustrating an example of the processing for identifying the range of the equipotential region in the first embodiment.
Figure 5E:
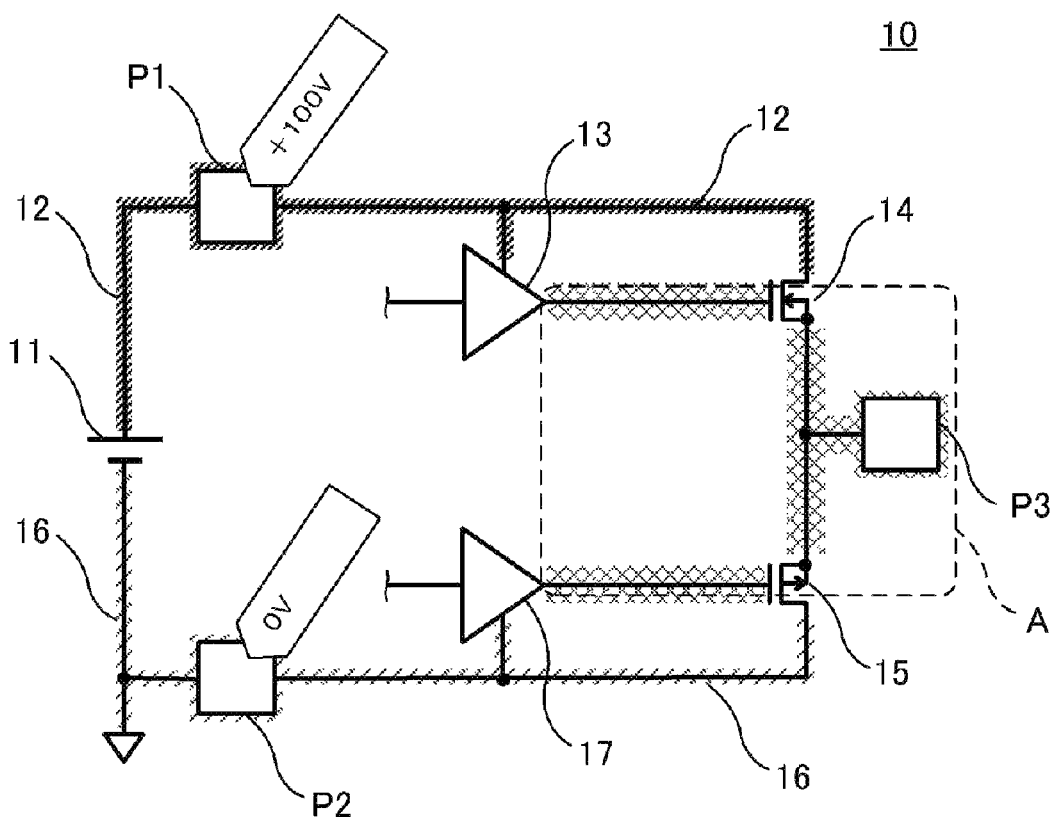
FIG. 5E is an explanatory diagram illustrating an example of the processing for identifying the range of the equipotential region in the first embodiment.

The PMOS transistor 15 has a potential identification label of "0 V" added to the drain terminal, and based on the determination criterion of this embodiment, the gate and the source have a low breakdown voltage therebetween and are short-circuited. Thus, as illustrated in FIG. 5D, when the PMOS transistor 15 is set to the ON state, conduction between the drain and the source is on, by which a potential identification label of "0 V" is added to not only the source terminal and the gate terminal of the PMOS transistor 15 and the external terminal P3, but also the source terminal and the gate terminal of the NMOS transistor 14.

Accordingly, it can be seen that the circuit component, to which the potential identification labels of "+100 V" and "0 V" are added repeatedly depending on the switching states of the NMOS transistor 14 and the PMOS transistor 15, requires a high breakdown voltage. Thus, the region surrounded by the dotted line of FIG. 5E, which includes the source terminal and the gate terminal of the NMOS transistor 14, the source terminal and the gate terminal of the PMOS transistor 15, and the external terminal P3, can be classified as a high breakdown voltage region A, and the other regions can be classified as low breakdown voltage regions.

As described above, for example, if there is a circuit element with breakdown voltage information indicating a low breakdown voltage in the classified high breakdown voltage region, the layout design support apparatus 100 can display the circuit element by adding error information to the circuit element to guide the user to correct it. The layout design support apparatus 100 identifies the range of the equipotential region by adding a potential identification label to the external terminal, but depending on the circuit type, a portion which is in a floating state or has a GND potential may be identified as the high breakdown voltage region. In addition, the user may individually identify a portion which cannot be identified simply by adding a potential identification label to the external terminal.

Here, the update part 111c and the verification part 111d will be described by referring back to FIG. 2.

The update part 111c updates the netlist 150a based on the potential identification label added to each circuit component by the equipotential region identification part 111b.

For the layout data 150b created based on the netlist 150a updated by the update part 111c, the verification part 111d verifies whether the high breakdown voltage design rule 150d and the low breakdown voltage design rule 150e are satisfied according to the breakdown voltage information added to the circuit component. Taking the explanatory diagram illustrated in FIG. 5E as an example, the verification part 111d uses the high breakdown voltage design rule 150d to check the NMOS transistor 14, the PMOS transistor 15, the external terminal P3, and the wirings connecting these, which are the circuit components in the region A of the high breakdown voltage region and in contact with the region A, and uses the low breakdown voltage design rule 150e to check the other circuit components.

If there is an error, the verification part 111d adds error information of DRC to the layout data 150b and displays a layout diagram obtained by synthesizing the layout data 150b and the error information on the display device 130 to illustrate the portions having errors to the user and thereby support the layout design.

Modified Example of the First Embodiment

An example of the processing for roughly identifying the range of the equipotential region for the entire circuit as illustrated in FIG. 5A to FIG. 5E has been described above. Next, an example of the processing for identifying the range of the equipotential region for a part of a circuit having more circuit components will be described with reference to FIG. 6A and FIG. 6B.

Figure 6A:
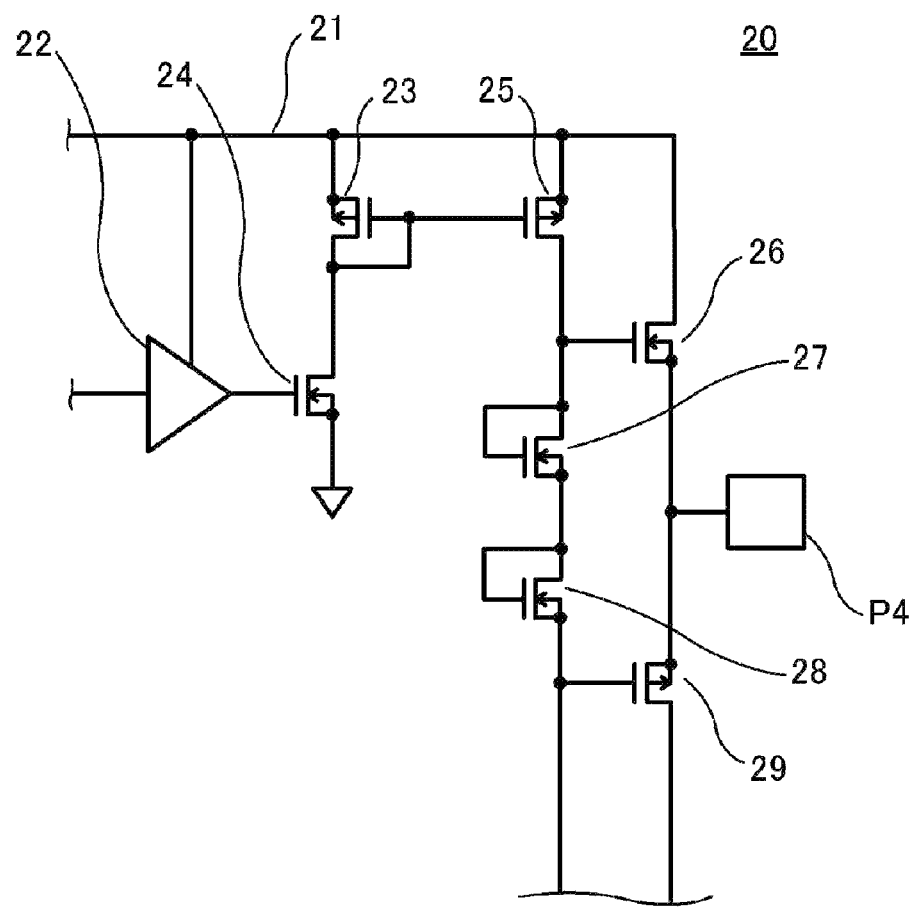
FIG. 6A is an explanatory diagram illustrating another example of the processing for identifying the range of the equipotential region in the first embodiment.
Figure 6B:
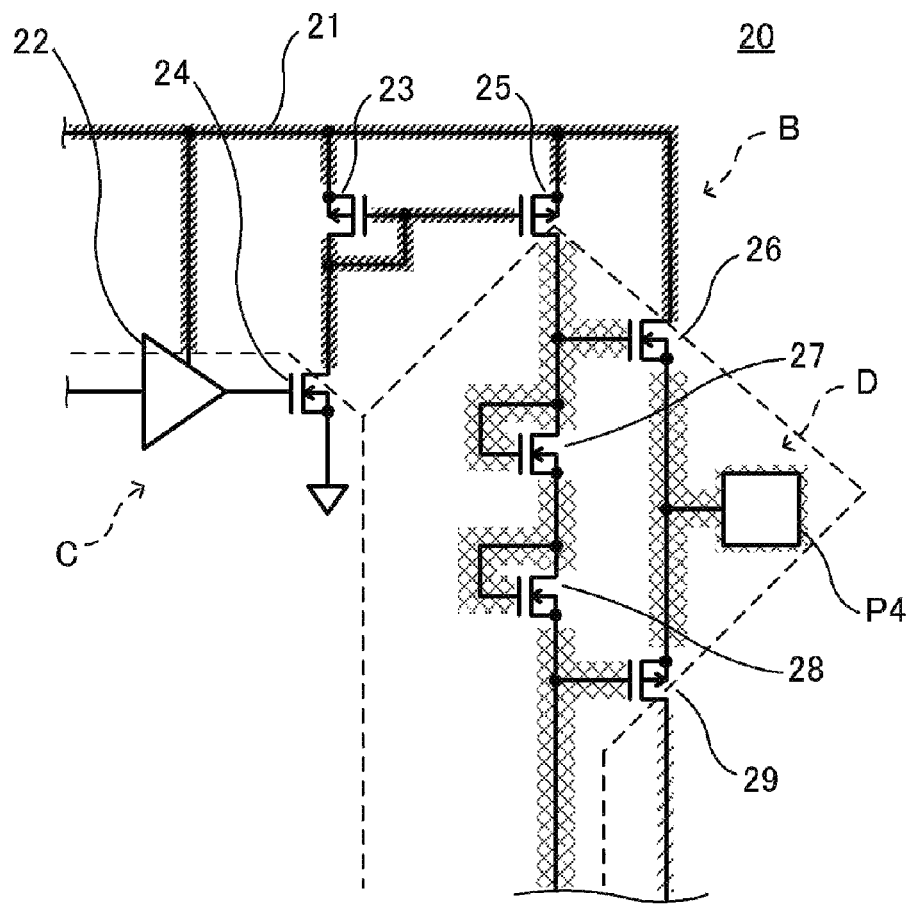
FIG. 6B is an explanatory diagram illustrating another example of the processing for identifying the range of the equipotential region in the first embodiment.

FIG. 6A and FIG. 6B are explanatory diagrams illustrating another example of the processing for identifying the range of the equipotential region in the first embodiment, and further add circuit components to a part of the circuit diagram as illustrated in FIG. 4. As illustrated in FIG. 6A, the power supply terminal of the amplifier 22, the source terminals of the PMOS transistors 23 and 25 forming a current mirror circuit, and the drain terminal of the NMOS transistor 26 are connected to the power supply voltage line 21 of the circuit 20. Further, the NMOS transistor 26 and the PMOS transistor 29 form a source follower push-pull circuit.

The PMOS transistor 23 is diode-connected, and has a drain terminal connected to the drain terminal of the NMOS transistor 24 and a gate terminal connected to its own drain terminal and the gate terminal of the PMOS transistor 25. The NMOS transistor 24 operates as a current source, and has a gate terminal connected to the output port of the amplifier 22 and a source terminal connected to the GND potential. The PMOS transistor 25 has a drain terminal connected to the gate terminal of the NMOS transistor 26 and to the gate terminal and the drain terminal of the NMOS transistor 27.

The NMOS transistor 26 has a source terminal connected to the external terminal P4 and the source terminal of the PMOS transistor 29. The NMOS transistor 27 is diode-connected, and has a source terminal connected to the gate terminal and the drain terminal of the NMOS transistor 28. The NMOS transistor 28 is diode-connected, and has a source terminal connected to the gate terminal of the PMOS transistor 29 and the GND potential. The PMOS transistor 29 has a drain terminal connected to the GND potential.

When the layout design support apparatus 100 performs the processing for identifying the range of the equipotential region for the circuit illustrated in FIG. 6A, the circuit is as illustrated in FIG. 6B. As illustrated in FIG. 6B, the layout design support apparatus 100 classifies the power supply voltage line 21 of the circuit 20 and the wiring connected to the power supply voltage line 21 into the low breakdown voltage region B. Further, the layout design support apparatus 100 processes the diode-connected PMOS transistor 23 as all the terminals are short-circuited. The NMOS transistor 24, the PMOS transistor 25, and the NMOS transistor 26 are classified into the low breakdown voltage region B with the drain terminal as a boundary. The amplifier 22 and the gate terminal and the source terminal of the NMOS transistor 24 are classified into the low breakdown voltage region C. Besides, the NMOS transistor 26 and the PMOS transistor 29 forming a source follower push-pull circuit, and the diode-connected NMOS transistors 27 and 28 are classified into the high breakdown voltage region D.

Second Embodiment

Figure 7:
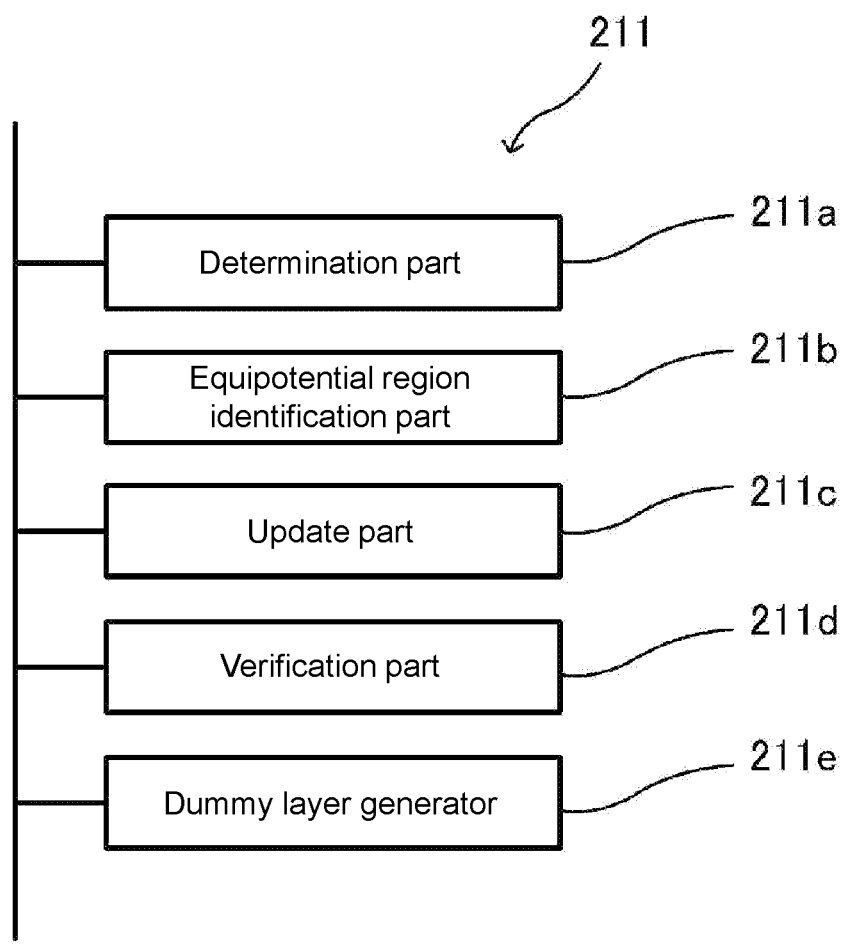
FIG. 7 is a block diagram illustrating the functional configuration of the control device of the layout design support apparatus according to the second embodiment.

FIG. 7 is a block diagram illustrating the control device of the layout design support apparatus according to the second embodiment. As illustrated in FIG. 7, the layout design support apparatus 200 according to the second embodiment is the same as the first embodiment except that the control device 110 of the layout design support apparatus 100 in the first embodiment is replaced with a control device 210 provided with a dummy layer generator 211e. Thus, the dummy layer generator 211e will be described here. The determination part 211a, the equipotential region identification part 211b, the update part 211c, and the verification part 211d are the same as the determination part 111a, the equipotential region identification part 111b, the update part 111c, and the verification part 111d, so description thereof will be omitted.

The dummy layer generator 211e generates a dummy layer according to the breakdown voltage information added to the circuit component and arranges the dummy layer on the layout when creating the layout data from the netlist. Specifically, the dummy layer generator 211e generates and arranges the dummy layer on an element isolation equipotential region of a peripheral circuit section at the minimum pitch of each design rule so as not to connect other wiring layers. By arranging this dummy layer, the loading effect is less likely to occur, so variations in wiring width and cross-sectional shape can be reduced, and the electrical characteristics of the circuit components can be prevented from changing due to location.

In addition, the verification part 211d verifies whether the layout including the dummy layer generated and arranged by the dummy layer generator 211e satisfies the design rule according to the breakdown voltage information. If there is an error, the layout design support apparatus 100 adds error information of DRC to the layout data including the dummy layer and displays a layout diagram obtained by synthesizing the layout data and the error information on the display device 130 to illustrate the portions having errors to the user and thereby support the layout design.

As described above, in the circuit element connected to the first external terminal to which the first potential identification label is added, the layout design support apparatus according to an embodiment of the present invention determines whether to short-circuit one terminal connected to the first external terminal and another terminal based on the determination criterion according to the element type information and the breakdown voltage information. When the layout design support apparatus determines not to short-circuit, the layout design support apparatus identifies the first equipotential region by adding the first potential identification label to the circuit components on the path from the first external terminal to the one terminal of the circuit element, and when the layout design support apparatus determines to short-circuit, the layout design support apparatus repeatedly performs the determination for the circuit element connected to the another terminal to identify the first equipotential region. After completing the identification of the first equipotential region, the layout design support apparatus identifies the second equipotential region when receiving the second potential identification label to be added to the second external terminal. As a result, the layout design support apparatus can easily identify regions with equal potentials even when circuit elements having different breakdown voltages coexist on one chip. Thus, the layout design support apparatus can lay out the space between wirings to the minimum size which meets the breakdown voltage to design a semiconductor device having a small chip size at low cost.

Each of the above embodiments illustrates classification into either the low breakdown voltage region or the high breakdown voltage region, but the classification is not limited to two types of breakdown voltage regions and may be three or more types of breakdown voltage regions. The three or more types of breakdown voltage regions may include, for example, a region of less than +10 V, a region of +10 V or more and less than +60 V, a region of +60 V or more and less than +100 V, a region of +100 V or more, etc.

What is claimed is:

1. A layout design support apparatus for an integrated circuit in which a plurality of circuit elements having different breakdown voltages coexist, the layout design support apparatus comprising:
    a storage device storing circuit connection data of the integrated circuit combining circuit components which comprise a first external terminal, a second external terminal, and the circuit elements to which element type information and breakdown voltage information are to be added;
    an input device receiving first potential information to be added to the first external terminal; and
    a control device which
    determines, in the circuit element connected to the first external terminal to which the first potential information is added, whether to short-circuit one terminal connected to the first external terminal and another terminal based on a determination criterion according to the element type information and the breakdown voltage information,
    adds the first potential information to the circuit components on a path from the first external terminal to the one terminal of the circuit element to identify a first equipotential region according to determining not to short-circuit the one terminal and the another terminal of the circuit element, and
    repeatedly performs determination for the circuit element connected to the another terminal and identifies the first equipotential region according to determining to short-circuit the one terminal and the another terminal of the circuit element, wherein the control device identifies a second equipotential region when the input device receives second potential information to be added to the second external terminal.

2. The layout design support apparatus according to claim 1, wherein the first equipotential region and the second equipotential region are identified as low breakdown voltage regions, and a region identified as both the first equipotential region and the second equipotential region is identified as a high breakdown voltage region.

3. The layout design support apparatus according to claim 2, wherein the control device adds error information to the circuit element as a target when the circuit element having the breakdown voltage information indicating a high breakdown voltage exists in the low breakdown voltage region or when the circuit element having the breakdown voltage information indicating a low breakdown voltage exists in the high breakdown voltage region.

4. The layout design support apparatus according to claim 2, wherein the determination criterion comprises determining not to short-circuit between a gate and a drain and between the drain and a source and to short-circuit the gate and the source when the circuit element included in the high breakdown voltage region or the circuit element at a position in contact with the high breakdown voltage region is an NMOS transistor.

5. The layout design support apparatus according to claim 3, wherein the determination criterion comprises determining not to short-circuit between a gate and a drain and between the drain and a source and to short-circuit the gate and the source when the circuit element included in the high breakdown voltage region or the circuit element at a position in contact with the high breakdown voltage region is an NMOS transistor.

6. The layout design support apparatus according to claim 1, wherein the control device creates and includes a dummy layer generated according to the breakdown voltage information added to the circuit component in layout data in the case of creating the layout data from the circuit connection data.

7. The layout design support apparatus according to claim 2, wherein the control device creates and includes a dummy layer generated according to the breakdown voltage information added to the circuit component in layout data in the case of creating the layout data from the circuit connection data.

8. The layout design support apparatus according to claim 3, wherein the control device creates and includes a dummy layer generated according to the breakdown voltage information added to the circuit component in layout data in the case of creating the layout data from the circuit connection data.

9. The layout design support apparatus according to claim 4, wherein the control device creates and includes a dummy layer generated according to the breakdown voltage information added to the circuit component in layout data in the case of creating the layout data from the circuit connection data.

10. A layout design support method for an integrated circuit in which a plurality of circuit elements having different breakdown voltages coexist, the layout design support method comprising:

storing circuit connection data of the integrated circuit combining circuit components which comprise a first external terminal, a second external terminal, and the circuit elements to which element type information and breakdown voltage information are to be added;

receiving first potential information to be added to the first external terminal;

determining, in the circuit element connected to the first external terminal to which the first potential information is added, whether to short-circuit one terminal connected to the first external terminal and another terminal based on a determination criterion according to the element type information and the breakdown voltage information;

adding the first potential information to the circuit components on a path from the first external terminal to the one terminal of the circuit element to identify a first equipotential region according to determining not to short-circuit the one terminal and the another terminal of the circuit element; and repeatedly performing determination for the circuit element connected to the another terminal and identifying the first equipotential region according to determining to short-circuit the one terminal and the another terminal of the circuit element, and comprising: identifying a second equipotential region according to receiving second potential information to be added to the second external terminal.

11. A manufacturing method of a semiconductor device, comprising a process of designing using the layout design support apparatus according to claim 1.

* * * * *